April 27, 1943.  T. COMPERE  2,317,590
EDUCATIONAL AND AMUSEMENT DEVICE
Filed Nov. 22, 1939
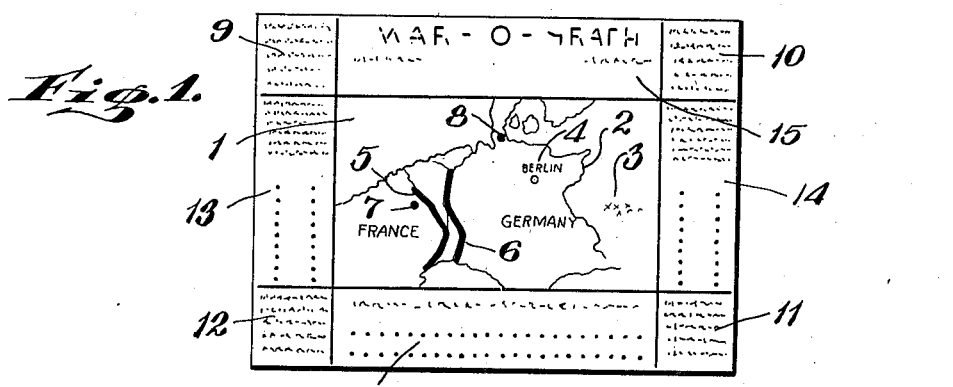
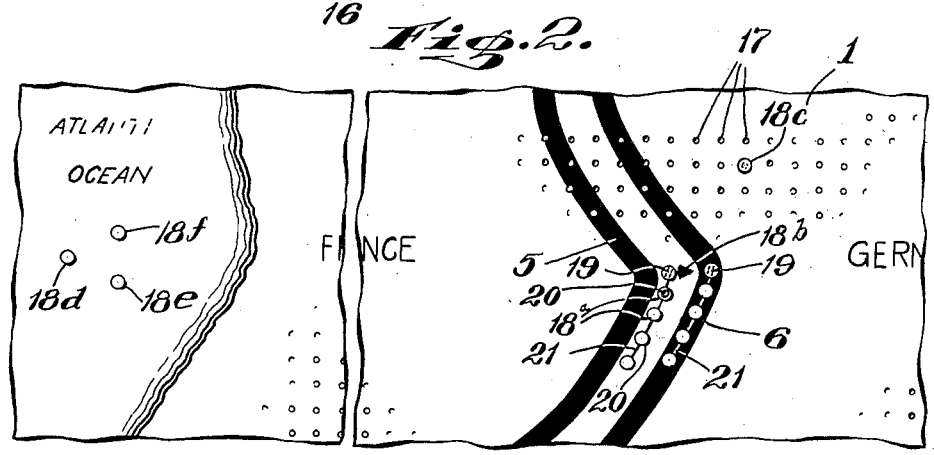
INVENTOR
Thomas Compere
BY
ATTORNEY Patented Apr. 27, 1943

2,317,590

UNITED STATES PATENT OFFICE 2,317,590

EDUCATIONAL AND AMUSEMENT DEVICE

Thomas Compere, Roslyn, N. Y.

Application November 22, 1939, Serial No. 305,591

10 Claims. (Cl. 35—40)

The present invention relates to an educational and amusement device. More particularly, it relates of a device providing for the progressive recording of political or other events which may change or modify the normal or previously existing geographical boundaries between nations or the like. Specifically, the invention relates to a map device on which the progress of a war, a battle or naval and air engagements may be indicated in such manner as to provide a visual record of any event or series of generally related events.

Fig. 1 is a plan view of a complete recording surface contemplated according to one embodiment of the invention;

Fig. 2 is an enlarged section of the surface shown in Fig. 1 showing a distribution of indicator elements thereon;

Fig. 3 and Fig. 3a are enlarged views of one form of indicator element (pin type) respectively in elevation and plan;

Fig. 4 and Fig. 4a are enlarged views of another form of indicator element (suction cup) respectively in part sectional elevation and plan;

Fig. 5 and Fig. 5a are enlarged views of a series arrangement of indicator elements respectively in elevation and plan; and Fig. 6 and Fig. 6a are enlarged views of a continuous type of indicator element respectively in part sectional elevation and plan; and Fig. 7 and Fig. 7a are enlarged views of another form of indicator element respectively in elevation and plan.

Referring now to the drawing, in Fig. 1, the numeral 1 designates a recording surface of a smooth, preferably air-impervious, nature on which have been imprinted a variety of interrelated indicia forming a map of the European area including those nations which, in 1939, were at war. In addition to boundary lines 2, terrain indicia 3 and indicia showing other natural or man made features, such as cities 4, there is shown in this representative illustration, such basic information as is required to provide a starting point for the sequence of events which are to be recorded.

The numeral 5 designates one line of fortifications disposed adjacent the national boundary between the countries France and Germany, and the numeral 6 a similar line of fortifications opposed thereto. Other fixed points of interest may be designated in any desired manner, as are fortified towns 7 and naval bases 8.

Bordering the map portion of the recording surface, provision has been made for the arrangement of vital statistics pertaining to the principal national divisions of the mapped area.

Numerals 9 to 16 indicate areas in which items of information, such as distances between cities, numerical strength of belligerents, size of armies, population of countries, production of airplanes and naval tonnage and losses may be recorded. In these areas space is available for keeping additional records.

Fig. 2 is an enlarged view of a portion of the surface shown in Fig. 1. In Fig. 2 have been shown such accessory and auxiliary details as could not be clearly indicated in Fig. 1. For example, one means contemplated for the recording of events involves the use of a network of openings punched, or otherwise formed in a recording surface at more or less closely spaced intervals, as indicated by the numeral 17. These openings may be provided over the entire surface 1 or in any desired part thereof. Another means involves the use of interconnected, illuminated, indicator elements 18, and for that purpose a plurality of outlet members 19 may be provided to open through the recording surface at suitable intervals.

In the situation illustrated by Fig. 2, a series of pin or peg type elements 18 (such as illustrated in Fig. 5) have been inserted in suitable openings in the recording surface, in order to outline the approximate disposition of two opposed lines of strong resistance.

The elements 18 are representatively illustrated in Figs. 3 and 4. In Fig. 3 is shown a pin type element composed of a body portion 22 and a peg or pin portion 23, adapted to be inserted in the openings 17 in the recording surface, as shown in Fig. 2, or provided with a sharp push-pin point for sticking into the recording surface. The body portion, in this instance, is formed to represent an airplane.

In Fig. 4, another type of indicator element is illustrated. The element shown has a body portion 24 and a suction cup base 25. This type of element is specially adapted for use with recording surfaces having no provision for the insertion of pins or pegs. Such surfaces should be substantially smooth and air-impervious in order to permit the suction cup to make firm and lasting contact. For using such elements as illustrated in Fig. 4, the recording surface may be constructed of plate glass or of flexible and transparent materials, such as air-impervious Cellophane sheets and the like, in which cases the indicia of boundaries, cities and other indicia of a relatively permanent nature may be applied by printing, painting, etc. to the reverse side of the surface from that to which the suction cup indicator elements are attached. The reading surface may also be of non-transparent material, either of a rigid nature such as wood, cardboard and the like or flexible such as paper, cloth, oil cloth, linoleum and the like, all of which are preferably constructed or treated, as by the application of varnish or lacqeur, to render the surface substantially air-impervious.

In Fig. 7, a type of indicator element is illustrated which is adapted particularly for use with recording surfaces mounted upon relatively thin stock such as stiff paper, corrugated board, or cardboard or thin fiberboard. These indicator elements are provided with a base or peg of oval or rectangular section 34, which is inserted into a similar elongated opening in the recording surface. By twisting the indicator element through an arc of 90° after insertion, the base or peg 34 is caused to be engaged tightly in the opening in the recording surface.

Preferred embodiments of this invention are the series of flexibly connected indicia elements shown in Figs. 5 and 6. These flexible units may be readily attached to and removed from any portion of the map surface and may be changed to indicate any desired shape of battle line.

In Fig. 5, the series of elements 18, shown in Fig. 2 as outlining lines of chief resistance, are illustrated in interconnected relation to each other and to the recording surface. In this figure, the elements 18 consist of a body portion 26 which is provided with one or more openings 27, which make rather loose frictional contact with one or more suitable connecting means 21 which may be cords, strips of rubber, wires, cloth or other covered wires, electrical conductors, and the like. Such connecting means may be of any suitable color to indicate the nation and/or service arm being represented by any particular series of indicators and are preferably easily deformable by hand and may be resilient or elastic, although it is preferred that the connector 21 should not exert such force, when a series of indicators 18 connected thereby is affixed to the surface 1 in a curved or irregular line, as to detach any of the indicators from the board. It will be understood that the connectors 21 may be stronger, i. e., may exert a greater resilient or elastic force against deformation when the indicator elements 18 are attached relatively firmly to the surface 1 by pins or pegs, than when such indicator elements are attached by vacuum cups. A simple form of this device for indicating a front or line of action comprises a series of pegs having a single hole pierced through the head of each peg, and an easily deformable wire, such as soft solder wire, threaded through these holes. In the event that the connectors 21 are electrical conductors and are used in conjunction with lamps or other illuminating devices 20 which are carried by any desired number of the indicator elements 18, the circuit may be completed by making electrical connection between the connectors 21 and wiring permanently attached preferably to the back of the board carrying the surface 1. Such wiring (not shown) may be connected to electrical outlets 19 which open through the recording surface 1 at suitable intervals. One of the indicator elements 18 may be provided with prongs 28, making either fixed or sliding electrical contact with the electrical conductor connecting elements 21, and such element may be "plugged in" to an outlet 19. Alternatively, the connector elements 21 may be passed through holes in the recording surface 1 and may make connection with wiring on the reverse side thereof in any suitable manner. In this way any greater length of the connector elements than is needed for the particular problem to be indicated, may be retained behind the recording surface, either loosely or on a suitable winding drum, to be drawn out as needed.

The indicator elements 18 may be threaded on the connector element or elements 21, and additional elements 18 may be added as desired.

Certain of the indicator elements 18a may be provided with a lamp socket 29, or other suitable connection for an illuminating means 20, which socket makes electrical contact with the connector elements 21. When more than one series of such illuminated indicator elements 18a is used at the same time on the recording surface 1, provision may be made for connecting separate series to separate electrical circuits, so that each series may be lighted, or caused to flash intermittently, independently of the other series.

The indicator elements 18 may be provided with several different means for attachment to the recording surface 1. As described above, such element may be mounted on prongs 28 for connection with electrical outlets 19, or it may be mounted on a pin or peg 23 for sticking into the recording surface, or for fitting into receiver 17 therein, or it may be mounted on a suction cup 25 for attachment by atmospheric pressure to the recording surface. Series of indicator elements may be made up with any one or any desired combination of all such means for attachment to the recording surface, as desired, or as best suits the particular problem.

A continuous type of indicator element is shown in Fig. 6. This element has a body portion 30 which is preferably made of easily deformable material such as rubber. It may be provided with any suitable means for attachment to the recording surface, such as electrical prongs, or pegs or pins, as illustrated above in connection with Fig. 5. A preferred means, illustrated in Fig. 6, comprises vacuum cups 31 which preferably extend a considerable distance from the under surface of the body portion 30, in order to make firm contact with the recording surface without being distorted by any bending of the long element to indicate a curve or irregular line. The location of such vacuum cups or other means for attachment, may be shown by suitable indications impressed into or formed on the upper surface of the body portion 30 opposite each attachment means 31, such as the projections 32. These may also be colored to indicate a nation and/or service arm, if desired, and the entire body portion may also be colored for the same purpose. This type of indicator may also be wired, as with electrical conductors 33, and provided with suitable sockets connecting therewith for use with lamps or other suitable illuminating devices such as the sockets 29 and lamps 20.

Various other modifications of the above described devices may also be used in substitution for or in conjunction therewith. For example, indicator devices may be constructed of magnetic material such as soft wire, and may be positioned on the recording surface, which in this case is preferably constructed of thin material such as cloth or paper, by means of magnetic means or electromagnetic means positioned on the reverse side of the recording surface.

The various specific modifications given above of this invention and of its elements, are presented herein for purpose of illustration and the invention is not to be limited thereto, as it will be understood that it embraces such other variations and modifications that come within the spirit and scope thereof.

I claim:

1. An information indicator device, comprising a recording surface containing a plurality of interrelated indicia impressed thereon and in combination therewith a plurality of indicator elements removably engageable with said surface in variable relation in locality to the indicia impressed thereon, and provided for deformable interconnected relation one to another.

2. An information indicator device, comprising a recording surface containing a plurality of interrelated indicia impressed thereon and in combination therewith a plurality of indicator elements removably engageable with said surface in variable relation in locality to the indicia impressed thereon, certain of said indicator elements being connected in series by elastic deformable means.

3. An information indicator device, comprising a substantially smooth, air-impervious surface containing a plurality of interrelated indicia impressed thereon and in combination therewith a plurality of interconnected indicator elements removably engageable with said surface by suction means in variable relation in locality to the indicia impressed thereon.

4. An information indicator device, comprising a substantially smooth, air-impervious surface containing a plurality of interrelated indicia impressed thereon and in combination therewith an elongated, deformable indicator element having a series of suction members attached thereto for removable engagement with said surface in variable relation in locality to the indicia impressed thereon.

5. An information indicator device, comprising a substantially smooth, air-impervious surface containing a plurality of interrelated indicia impressed thereon and in combination therewith, an elongated, deformable indicator element having a series of suction members attached thereto for removable engagement with said surface in variable relation in locality to the indicia impressed thereon, and having visible locating means vertically above each of said suction members.

6. An information indicator device, comprising a recording surface containing a plurality of interrelated indicia impressed thereon and having a plurality of apertures in the surface thereof and in combination therewith, a plurality of indicator elements removably engageable with said apertures in variable relation in locality to the indicia impressed on said surface, certain of said indicator elements being connected in series by elastic deformable means.

7. An information indicator device, comprising a recording surface containing a plurality of interrelated indicia impressed thereon and in combination therewith, a plurality of spaced, interconnected indicator elements mounted on a flexible continuous electrical conductor, illuminating means carried by certain of said spaced indicator elements and connected therein to said electrical conductor, said conductor being provided for variable engagement in different localities on said recording surface by means independent of the electrical circuit.

8. In an informational recording device including a recording surface having a plurality of indicia thereon, an indicator element comprising an elongated member of a deformable material, an electric conductor extended longitudinally through said member, spaced sockets in the upper surface of said member connected in circuit with said conductor, means for establishing an electric circuit through said circuit and sockets, and means independent of said electrical circuit for securing said member to the surface of the recording device in variable relation in locality to the indicia thereon.

9. In an informational device, including a recording surface having a plurality of indicia thereon, an indicator element according to claim 8, in which said means for securing said elongated member to the surface of the recording device in variable relation in locality to the indicia thereon consists of a plurality of longitudinally spaced suction cup members formed in the base of said elongated member, the peripheral edge of the cup members extending outwardly beyond the elongated member.

10. In an information recording device, including a recording surface having a plurality of indicia thereon, an indicator element comprising a plurality of element sections, disposed in spaced relation one to another, and in variable engagement in different localities on said recording surface, passageways diametrically of each element section and an elongated connector for said sections disposed in the passageways therein, and extending between sections.

THOMAS COMPERE.